LIQUID COOLED METAL ENCLOSED ISOLATED PHASE BUS

Filed Oct. 30, 1959 4 Sheets-Sheet 1

INVENTOR.
ROY H. ALBRIGHT
BY Ostrolenk, Faber, Gerb & Soffen
ATTORNEYS

INVENTOR.
ROY H. ALBRIGHT
BY Ostrolenk, Faber, Gerb & Soffen
ATTORNEYS

LIQUID COOLED METAL ENCLOSED ISOLATED PHASE BUS

INVENTOR.
ROY H. ALBRIGHT
BY Ostrolenk, Faber, Gerb & Soffen
ATTORNEYS

LIQUID COOLED METAL ENCLOSED ISOLATED PHASE BUS

Filed Oct. 30, 1959 4 Sheets-Sheet 4

INVENTOR.
ROY H. ALBRIGHT
BY Ostrolenk, Faber, Gerb & Soffen
ATTORNEYS

United States Patent Office 3,067,278

Patented Dec. 4, 1962

3,067,278

LIQUID COOLED METAL ENCLOSED ISOLATED PHASE BUS

Roy H. Albright, Greensburg, Pa., assignor to I-T-E Circuit Breaker Company, Philadelphia, Pa., a corporation of Pennsylvania Filed Oct. 30, 1959, Ser. No. 849,894
11 Claims. (Cl. 174—15)

This invention relates to metal enclosed isolated phase bus, and more particularly relates to a liquid cooling system for isolated phase bus wherein hollow bus conductors are used and have a liquid coolant such as water forced therethrough for cooling the bus.

Forced cooling of bus conductors is well known in the art, and some of the methods used have been extended to the very special conditions imposed by isolated phase bus wherein the bus conductor is carried along the longitudinal axis of a metal housing, and is insulated from and carried by the metal housing as by pillar insulators which extend radially from the housing to the bus.

The typical forced cooling system for this type of structure is a forced air cooling system where cooling air is forced between the interior of the housing and the exterior of the conductor. While this type of cooling is effective, it is limited to cases where the length of the bus run is relatively short since the cooling air will reach too high a temperature when flowing over a relatively long length of bus. In general, however, it is apparent that forced cooling by air is far less efficient than cooling by a liquid means which has a substantially larger specific heat than air.

Liquid coolants such as water have been used in the cable conductor art wherein the main cable is enclosed in a flexible metal tube which may be at the same potential as the cable. Water is then circulated between the inner walls of the tube and the outer walls of the cable conductor in the same manner as in the aforementioned forced air cooling of isolated phase bus. This method has been extremely effective mainly because a liquid can be used without concern for the liquid or impurities in the liquid creating an electrical path between the central conductor and its tubing, since the tube may be at the same potential. Since this problem is very severe in the case of isolated phase bus, attempts to extend this type of cooling to isolated phase bus would be inoperative. That is to say, where the potential between the housing and central conductor may be of the order of 67,000 volts, the liquid, or impurities carried by the liquid, would create a possible short circuit path of relatively short length.

The principle of this invention is to form the bus conductors of the isolated phase bus of hollow conductor members (in conformity with the usual practice), and to force a liquid coolant through these hollow conductors. In combination with this, and to make the practice of the invention possible, we provide novel means for introducing the liquid coolant such as water to the center of the bus, and then provide an exit means from the bus to a pump and heat exchanger by novel structures which prevent the liquid coolant from causing an electrical path to be created between the conductor and its housing which must be electrically insulated from one another.

To prevent a possible phase-to-phase fault through the liquid when the liquid of the different phases are collected in a common pipe, a liquid having a high dielectric strength is used, such as deionized water.

Generally, each of the phase conductors of the bus is provided with separate metal enclosure means which is adapted with an insulator such as a porcelain insulator through which the liquid coolant is forced, either in entering the isolated phase bus at one end, or leaving the isolated phase bus at the other end.

It is particularly desirable that the entrance of the coolant through this entrance means and the exit means is adjacent a bolted connection, such as the connection of the bus to a generator or transformer bushing whereby this bolted connection receives the full benefit of the forced cooling.

In addition, a novel flexible splice assembly is provided where individual lengths of bus within the bus run may be connected in a simple manner while maintaining a fluid-tight passage through the bus for the liquid coolant as well as assuring a low resistance electrical connection which is subjected to the fluid cooling effects. This connecting means will further be seen to be a flexible one so that strain due to bus expansion or contraction, or due to misalignment in the adjacent ends of the buses to be joined, will be absorbed by this flexible means.

It will be further seen hereinafter that the novel cooling system is particularly applicable to an arrangement of buses in a three-phase system where each of the buses are at one corner of an equilateral triangle. This type of positioning produces balanced reactances over the bus run so that voltage unbalance is limited to a very small amount, and provides more uniform magnetic fields about the conductors to reduce the magnitude of circulating currents in the housings. Because of this symmetric positioning of the bus conductors, the forced cooling piping can also be symmetric. For example, a supply pipe can run down the middle of the equilateral triangle formed by the buses, and then can radiate out to each of the buses which will conduct the fluid for cooling purposes.

Accordingly, the primary object of this invention is to provide a novel cooling system for isolated phase bus.

Another object of this invention is to provide a fluid cooling system for bus conductors which are hollow, and are contained centrally of metal enclosure insulated from the bus conductor.

Another object of this invention is to provide a highly efficient fluid cooling system for isolated phase bus which permits a small capacity bus to be used for large currents.

Yet another object of this invention is to provide a novel fluid cooling system for isolated phase bus which permits the coolant to enter the bus enclosure in an insulated manner, and be conducted by hollow bus conductors.

Still another object of this invention is to provide a novel fluid cooling system for isolated phase bus wherein bus conductor sections are connected by flexible connector means which permit misalignment of the ends of the conductors to be connected, and provides a continuous fluid path for the fluid.

A still further object of this invention is to provide a novel fluid cooling system for isolated phase buses wherein the fluid is carried through hollow conductors and flows adjacent to various bolted connections in the bus system.

These and other objects of this invention will become apparent from the following description when taken in connection with the drawings, in which:

FIGURE 1 schematically shows the fluid cooling system of the invention.

Figures 1, 4:
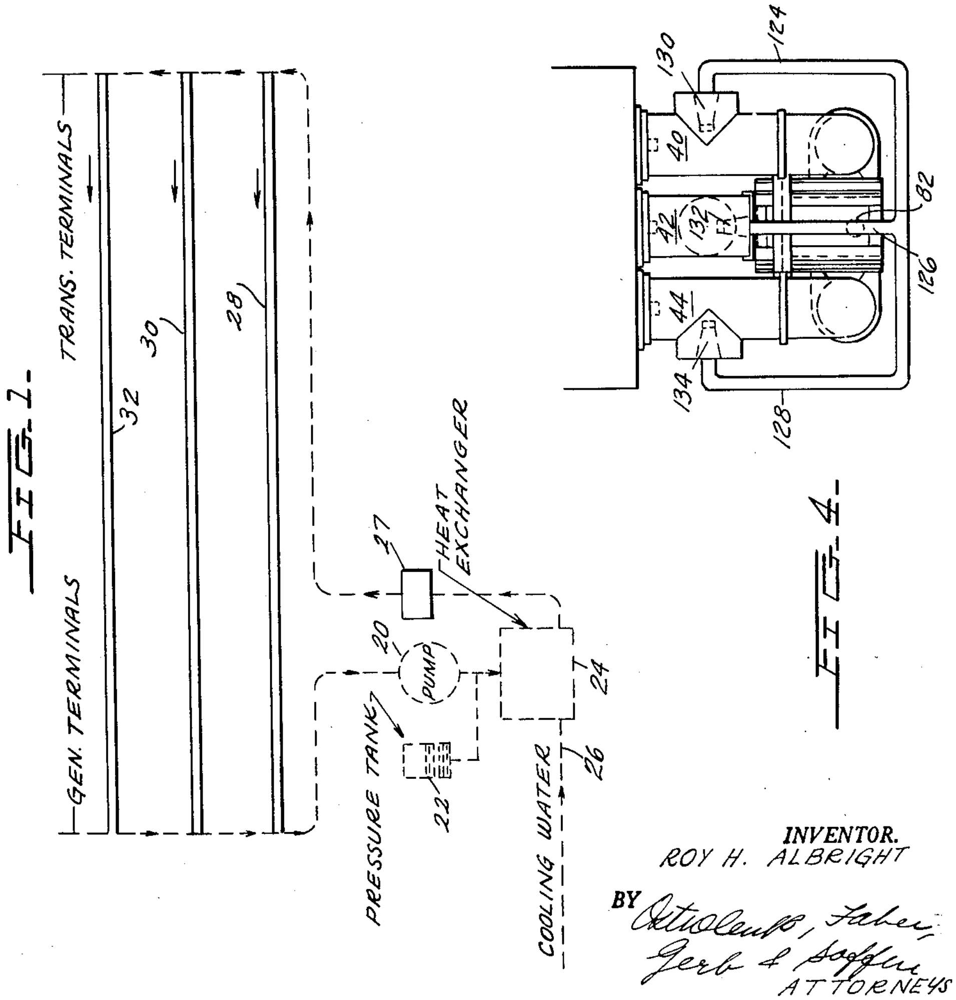
FIGURE 4 is an enlarged side view illustrating the manner in which the coolant emerges from illustrated phase buses at the generator end of FIGURE 2.

Referring first to FIGURE 1, the figure schematically illustrates the fluid cooling system of the invention. In FIGURE 1, a pump 20 which is under the control of a pressure tank 22 in the usual manner passes a coolant through a heat exchanger 24 which has a source of cooling water illustrated by the dotted line 26. The coolant from heat exchanger 24 then passes through a de-ionizer 27 which removes minerals from the cooling water so that the resistivity of the water is very high and of the order of several million ohms per cubic centimeter. The coolant then flows, as illustrated by the arrows, to the right-hand end or transformer terminal end of conductors 28, 30 and 32 which represent the hollow central conductors of an isolated phase bus system. The liquid coolant then flows through the conductors 28, 30 and 32 to the left-hand end of the bus identified as the generator terminals, and thence back to pump 20, at which point a full closed cycle has been completed.

Figure 3:
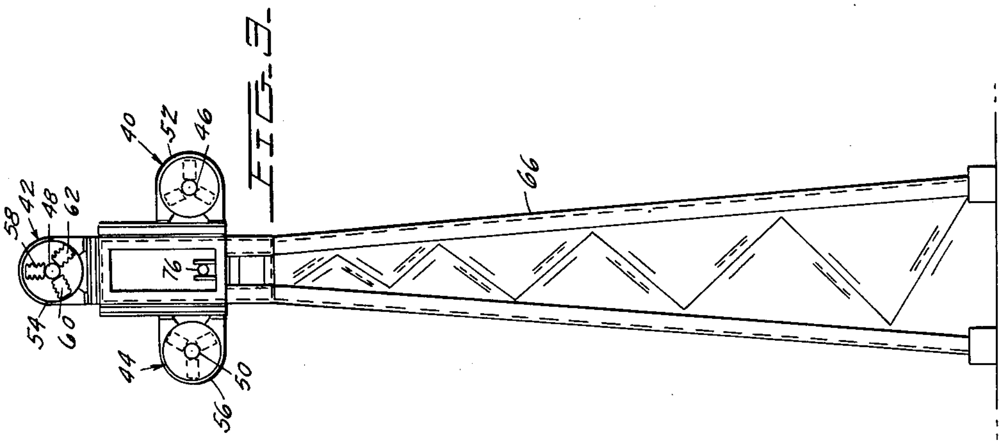
FIGURE 3 illustrates a cross-sectional view of one of the supporting trusses of FIGURE 2, and specifically illustrates the triangular configuration of the bus.
Figure 2:
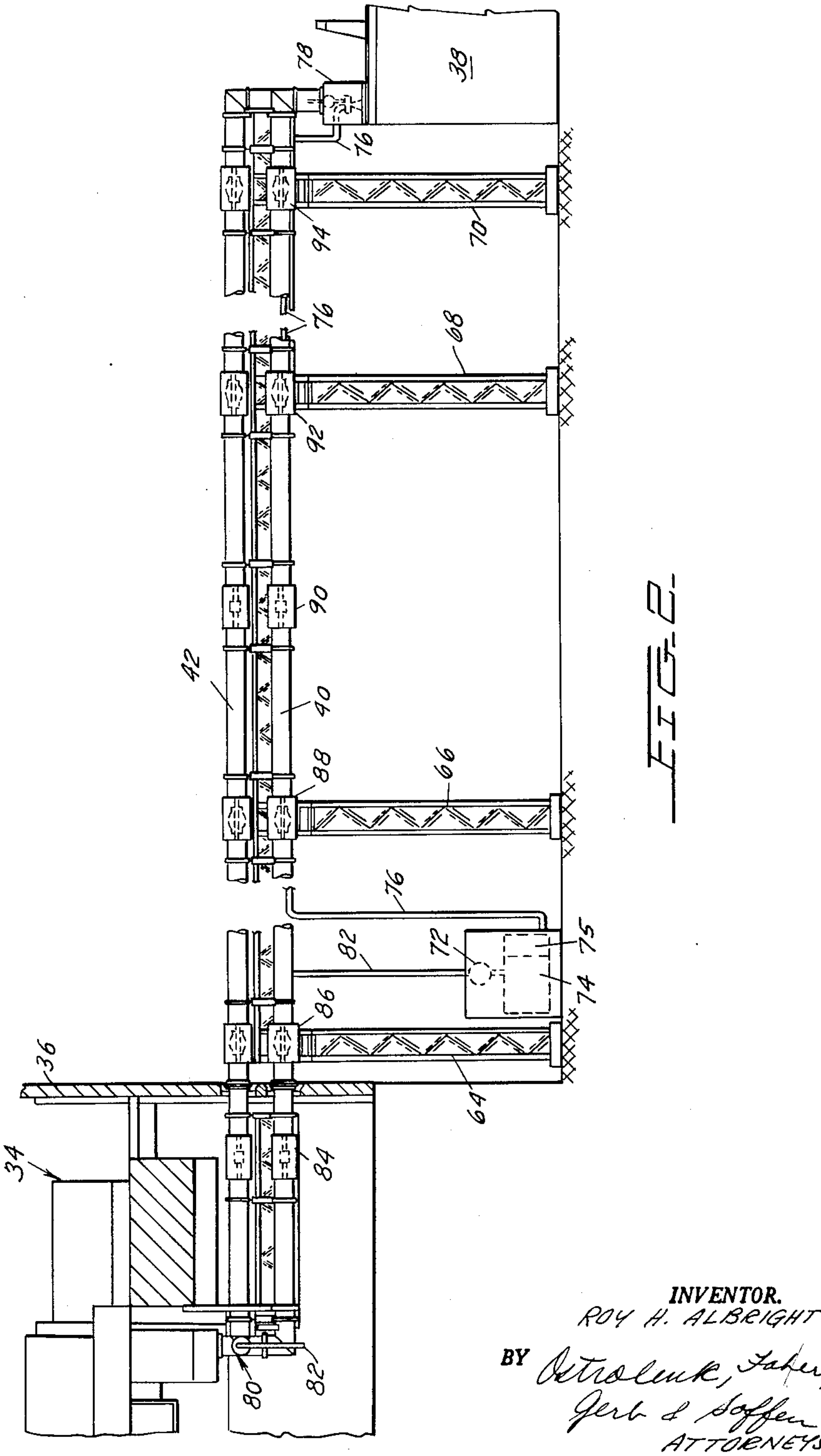
FIGURE 2 shows a side plan view of a multiphase isolated phase bus system which interconnects a generating station and a transformer.

A typical application of the novel fluid coolant system may be made to the isolated phase bus system shown in FIGURES 2 and 3.

Referring now to FIGURES 2 and 3, the figures illustrate a multiphase isolated phase bus system for connecting a generating station 34 which is contained within a building, as indicated by wall 36 to externally positioned distribution transformer 38. The system is comprised of three phases 40, 42 and 44 wherein each of these phases is formed, as best seen in FIGURE 3, of a central conductor 46, 48 and 50, and a surrounding metallic enclosure 52, 54 and 56 respectively.

The central conductor, such as central conductor 48 of phase 42, is carried centrally of its enclosure 54 by insulators such as insulators 58, 60 and 62 which radiate from the inside of housing 54 to the conductor 48 in the well-known manner. As is well-known, pairs of these supporting insulators are axially spaced along the length of the enclosures to afford adequate support of the central conductors.

The bus conductors are carried in a triangular configuration, although the invention could be applied to any desired pattern of bus positioning.

The complete bus structure is then carried in any desirable manner by vertical towers, such as towers 64, 66, 68 and 70, tower 66 being illustrated in FIGURE 3. For long outdoor runs (the run illustrated in FIGURE 2 could be 400 feet or longer), the system is supported in such a way as to make the best utilization of limited ground space, and to achieve a sufficiently high elevation to permit passage of trucks, railroad cars, etc., underneath the buses. The towers 64, 66, 68 and 70 are of structural steel members located at a point below the bus-work where the steel members will not be substantially heated by the magnetic field surrounding the conductors, such as conductors 46, 48 and 50. The upper portion of the towers in proximity to these buses are preferably of aluminum structural members to eliminate heating by induction.

Trusses of structural aluminum members are shown in FIGURE 2 as spanning from tower to tower for support of the bus. These trusses could be eliminated by making the bus housings in single piece lengths sufficient to span from tower to tower, and thereby allow the housings themselves to serve as their own structural support members. Preferably, however, the bus housings are made in relatively short sections which consist of cylindrical shells having the insulator and mounting supports near each end.

The central conductors, such as conductors 46, 48 and 50, are generally hollow aluminum tubes. It has been found that this hollow shape can be taken advantage of as an ideal fluid conductor for conducting a cooling medium. This has been prevented in the past because of the necessity for maintaining electrical insulation between the surrounding metal housing and the central conductor. In accordance with the invention, however, a fluid coolant is introduced into the conductor while maintaining this required electrical insulation between the housing and central conductor.

More specifically, the outer housing is provided with an insulator such as a porcelain bushing attached thereto through which fluid can be introduced to the central conductor without metallic connections from the common inlet or return pipe and without connection from the housing to its respective conductor. This type of arrangement is shown in FIGURE 2 where a schematically illustrated pump 72 and associated heat exchanger 74 are connected through de-ionizer 75 to an input conduit 76. Conduit 76 raises vertically to the truss structure, as illustrated in FIGURE 3, and then runs along the truss structure to a housing section 78 at a terminal bushing of transformer 38. Conduit 76 then enters housing section 78, shown in FIGURE 2, for phase 40. In a like manner, conduits derived from main conduit 76 also enter housing portions for each of the other phases.

In FIGURE 2, and as will be discussed more fully hereinafter, a porcelain insulator is placed in the surface of housing portion 78, and communicates with a chamber preferably adjacent the bolted connection to the transformer terminal and the central bus 46 of phase 40 and thence to the central portions of bus 46 where the fluid flows upwardly and then to the left and back to the generator or terminals of generator or station 34. In a like manner, the fluid enters each of conductors 48 and 50 and flows to the left to their respective generator terminals. At the generator terminal, the fluid leaves the isolated phase bus through a similar type of porcelain bushing shown as being contained by housing portion 80 at the generator bushing for phase 40 to an outlet pipe 82 which, in the manner shown for conduit 76, is supported by the bus truss and then drops when it reaches pump 72.

Because of the relatively long length of bus conductor, the usual practice is to use relatively short lengths of bus conductor, and then to couple these relatively short bus conductors to one another to complete the long electrical path. These connecting sections are illustrated in FIGURE 2 at positions 84, 86, 88, 90, 92 and 94, and are better seen in FIGURE 5 which illustrates generally how adjacent sections of bus conductors are joined together.

Figure 5:
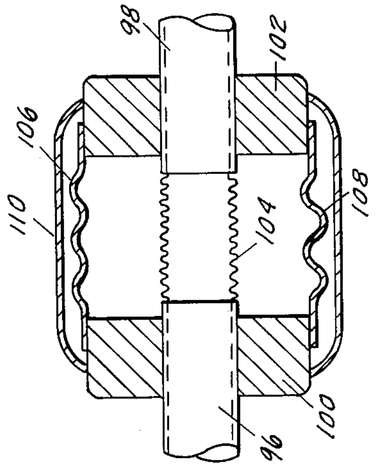
FIGURE 5 illustrates a flexible connector member used throughout the system of FIGURE 2 for connecting adjacent lengths of buses.

In FIGURE 5, a first bus conductor 96 is to be connected to a second bus conductor 98, it being kept in mind that the connection must be such that there will be a continuous fluid duct, as well as electrical continuity for the connection. To accomplish this, a first connecting block 100 and a second connecting block 102 are electrically connected to buses 96 and 98 respectively. A flexible tube 104 is then connected between the ends of buses 96 and 98 to complete the continuous fluid path, and, in part, provide a path for some of the bus current. The major part of the bus current, however, is carried over a plurality of angularly distributed flexible conductive straps 106 and 108 which are formed to permit expansion and contraction for relatively small strain.

The complete connection is then surrounded with a corona shield 110 in order to increase the impulse strength at the junction.

Because of the relatively large diameter at the junction, it will be noted from FIGURE 2 that the housing diameter at the junctions is increased so that proper electrical clearance may be maintained between the housing and the central conductor.

Figure 6:
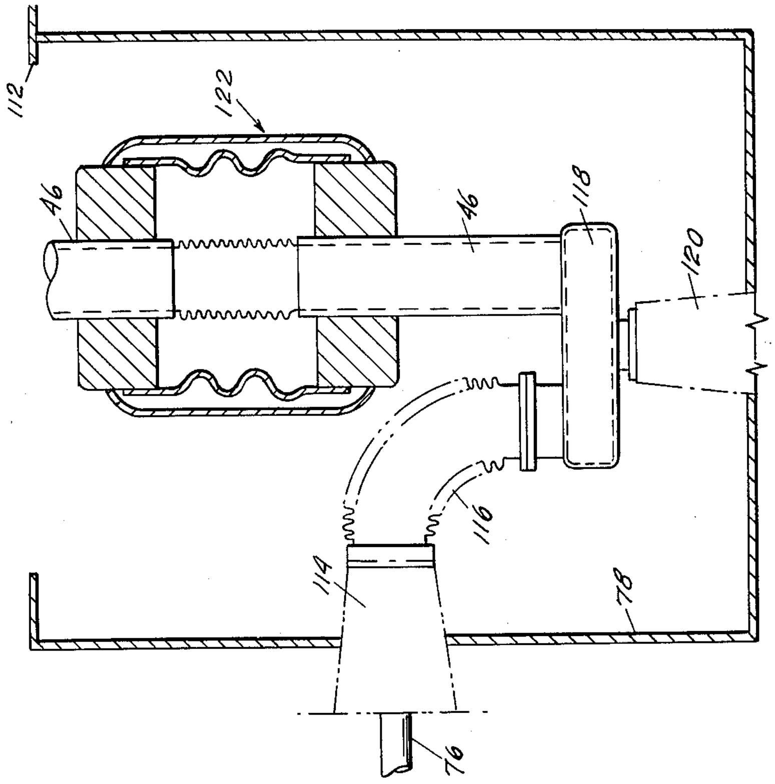
FIGURE 6 illustrates the manner in which the fluid conducting pipes enter the isolated phase bus at the transformer terminal end.

FIGURE 6 more specifically illustrates the manner in which the fluid is introduced into the housing at the transformer bushing. In FIGURE 6, housing 78 has an opening 112 which is connectable to housing 52 of phase 40 in any desired manner. One end of the housing has a hollow porcelain bushing 114 therein through which it receives the fluid of conduit 76. Thus, the fluid is introduced to the internal portions of housing 76, while satisfying the requirement of electrical insulation between the housing and central conductor. After passing through bushing 114, the fluid passes through a flexible conduit 116 which communicates with a hollow section 118 which is immediately adjacent the transformer bushing 120 for phase 40.

Section 118 electrically receives conduit 46 of phase 40 to electrically connect conduit 46 to terminal bushing 120 as well as to provide communication between flexible conduit 116 and the central portions of conduit 46. From conduit 46, a flexible connector 122 of the type described in FIGURE 5 then permits the conduit 46 to enter into the normal housing structure 52 which leads the electrical connector to the corresponding generator terminal in the generator station.

By using a flexible tubing, such as tubing 116, a degree of misalignment will be permissible between the housing bushing comprised of the components within housing 76 and the transformer terminal bushing 120, and also relieves the transformer bushing from objectionable stresses due to unequal movements on expansion and contraction of the various parts.

It is to be specifically noted that this novel structure, as set forth in FIGURE 6, permits entrance of fluid coolant from conduit 76 to the central conductor 46 without disturbing the electrical insulation between conduit 46 and its housing, and also provides insulation from the phase including conductor 46 to other phases. Furthermore, the point of entry of the coolant is adjacent the connection between the transformer terminal and into the conductor whereby the means for connecting these two elements, such as a bolt means or any other desired clamping mechanism, is subjected to the full cooling effect of the liquid coolant.

At the generator end, and at a point at which the coolant leaves the bus conductors to be returned through a heat exchanger, housings similar to those shown in FIGURE 6 are used, this system being shown in FIGURE 4 for each of the phases. Referring now to FIGURE 4, the common conduit 82 is connected to each of phases 40, 42 and 44 by means of branch conduits 124, 126 and 128 respectively which enter their respective housings through bushings 130, 132 and 134 respectively, in the same manner as previously described in connection with FIGURE 6 for the connection between conduit 76 and the conductors at the transformer end of the system. Therefore, the tubing entering each of the phase conductors is electrically insulated by the partial coolant path through the insulators entering the housings.

Figure 8:
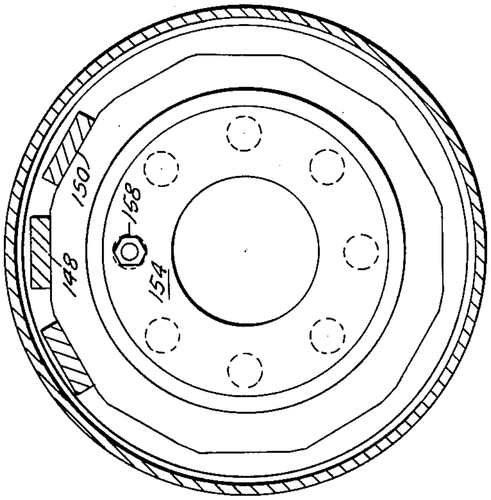
FIGURE 8 is a cross-sectional view of the connector of FIGURE 7 when taken across the lines 8—8 in FIGURE 7.
Figure 7:
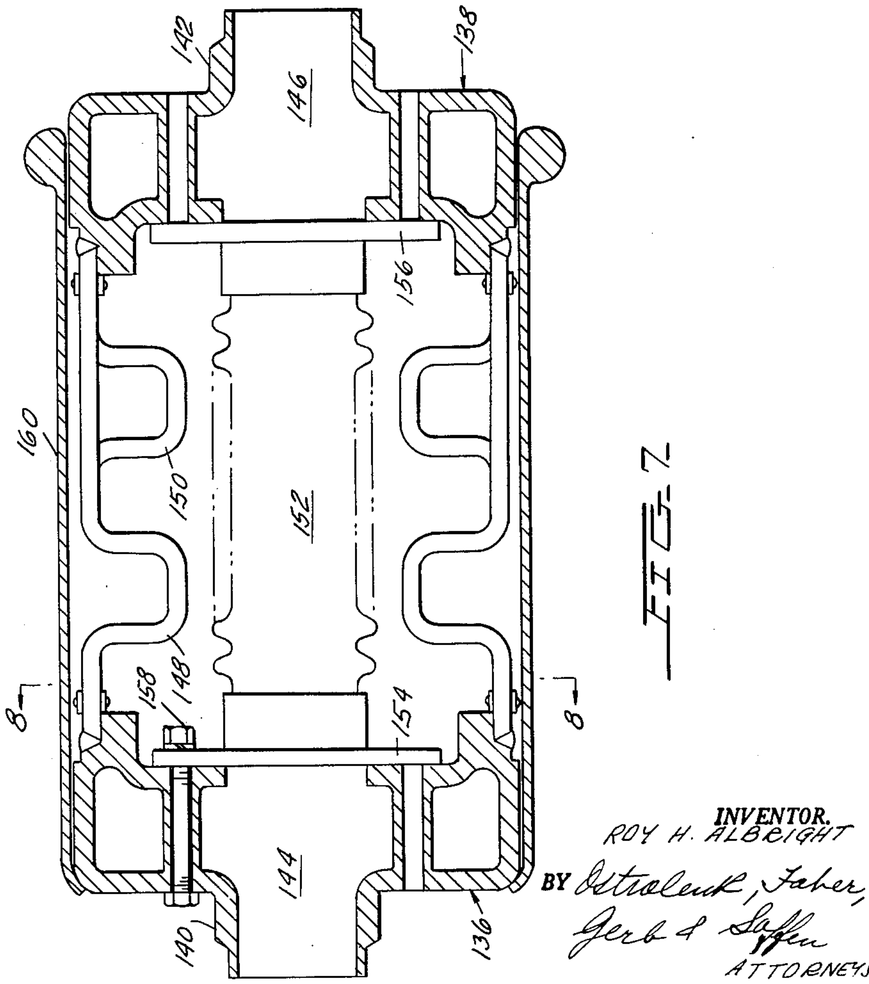
FIGURE 7 is a side cross-sectional view of a preferred embodiment of the connector of FIGURE 5.

A preferred embodiment of the expansion connector set forth in FIGURE 5 is shown in FIGURES 7 and 8 where a first and second casting 136 and 138 are welded to the ends of the conductor sections to be joined at protruding portions 140 and 142 respectively. The castings 136 and 138 are provided with hollow central portions 144 and 146 which communicate with central openings of the bus conductors to be connected thereto.

Flexible connectors of conductive material, such as connectors 148 and 150 of FIGURES 7 and 8, are then welded between castings 136 and 138 to form an electrically continuous path between the castings. A member of flexible metal tubing 152 is then provided with flanged fittings 154 and 156 which may be bolted to the faces of castings 136 and 138 as by bolt 108, as shown in FIGURES 7 and 8. In order to make this connection fluid-tight, the faces of castings 136 and 138 receiving flange 154 are preferably machined and washer-type gasket-type seals may be provided between the surfaces of the two flanges and the castings.

A corona shield 160 is then clamped in place over the complete assembly to increase the impulse rating of the system.

As previously mentioned, this novel cooling system is particularly applicable to an arrangement of buses which are positioned at the corners of an equilateral triangle. In FIGURES 2 and 3, the embodiment selected utilizes this triangular configuration for the positioning of the bus phases 40, 42 and 44. This type of configuration lends itself to an easy arrangement of the cooling fluid, since a centrally positioned inlet and outlet pipe may be provided for the same supports as used for the phases.

The arrangement is of a further desired nature, since it has been found that the triangular configuration provides balanced reactances so that the voltage unbalance between phases is limited to a very small amount, even on a long run of bus. Furthermore, because of the triangular configuration, there are uniform fields about the various phase conductors which substantially reduce the magnitude of circulating currents in the housings or enclosures or the bus conductors.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. A forced liquid cooling system for a multiphase isolated phase bus system; said multiphase system including at least three phases; each of said phases comprising an elongated central bus conductor and a metal housing therefor; each of said metal housings having axially disposed insulator means positioned internally thereof for supporting its said respective bus conductor along the axis of said housing; each of said buses being hollow; said forced cooling system being adapted to force liquid coolant through the center of said hollow buses; said forced liquid cooling system including a common pump means having input conduit means connected to a first axial position on respective buses of said multiphase system and outlet conduit means connected to a second axial position on respective buses of said multiphase system; said pump means being external of said housings; said first and second conduit means passing through said housing means of said buses associated with said conduit means in insulated relationship; each of said housings having porcelain insulator means positioned adjacent said first and second position of their respective buses for receiving said first and second conduit means respectively; whereby each of said housings remains insulated from its respective bus and from each of the other buses of said multiphase system.

2. A forced liquid cooling system for a multiphase isolated phase bus system; said multiphase system including at least three phases; each of said phases comprising an elongated central bus conductor and a metal housing therefor; each of said metal housings having axially disposed insulator means positioned internally thereof for supporting its said respective bus conductor along the axis of said housing; each of said buses being hollow; said forced cooling system being adapted to force liquid coolant through the center of said hollow buses; said forced liquid cooling system including a common pump means having input conduit means connected to a first axial position on respective buses of said multiphase system and outlet conduit means connected to a second axial position on respective buses of said multiphase system; said pump means being external of said housings; said first and second conduit means passing through said housing means of said buses associated with said conduit means in insulated relationship; whereby each of said housings remains insulated from its respective bus and from each of the other buses of said multiphase system; said pump means, first and second conduit means and said hollow buses forming a closed cooling system; said closed cooling system further including heat exchange means positioned external of said housings.

3. A forced liquid cooling system for a multiphase isolated phase bus system; said multiphase system including at least three phases; each of said phases comprising an elongated central bus conductor and a metal housing therefor; each of said metal housings having axially disposed insulator means positioned internally thereof for supporting its said respective bus conductor along the axis of said housing; each of said buses being hollow; said forced cooling system being adapted to force liquid coolant through the center of said hollow buses; said forced liquid cooling system including a common pump means having input conduit means connected to a first axial position on respective buses of said multiphase system and outlet conduit means connected to a second axial position on respective buses of said multiphase system; said pump means being external of said housings; said first and second conduit means passing through said housing means of said buses associated with said conduit means in insulated relationship; each of said housings having porcelain insulator means positioned adjacent said first and second position of their respective buses for receiving said first and second conduit means respectively; said pump means, first and second conduit means and said hollow buses forming a closed cooling system; said closed cooling system further including heat exchange means positioned external of said housings; said liquid coolant being water; said closed cooling system further including de-ionizer means for reducing the conductivity of said water.

4. A forced cooling system for isolated phase bus; said isolated phase bus comprising an axially elongated hollow conductive bus and a hollow metal housing for said bus; said bus being carried centrally of said metal housing and being electrically insulated therefrom; said forced cooling system including liquid coolant means and a pump means therefor; said pump means being positioned externally of said metal housing; said forced cooling system further including conduit means for connecting an output end of said pump means to the hollow opening of said hollow conductive bus at a first axial point on said bus and an input end of said pump means to the hollow opening of said hollow conductive bus at a second axial point on said bus; said pump passing said liquid coolant directly through the hollow opening of said hollow conductive bus between said first and second axial points; said hollow conductive bus including a first and second bus portion positioned end to end; said first axial point being in said first bus portion, said second axial point being in said second bus portion; a connecting means for said first and second bus portion; said connecting means including flexible electrical connecting means for establishing electrical continuity through said bus, and a hydraulic connecting means for establishing hydraulic continuity through the hollow center of said bus.

5. A forced cooling system for isolated phase bus; said isolated phase bus comprising an axially elongated hollow conductive bus and a hollow metal housing for said bus; said bus being carried centrally of said metal housing and being electrically insulated therefrom; said forced cooling system including liquid coolant means and a pump means therefor; said pump means being positioned externally of said metal housing; said forced cooling system further including conduit means for connecting an output end of said pump means to the hollow opening of said hollow conductive bus at a first axial point on said bus and an input end of said pump means to the hollow opening of said hollow conductive bus at a second axial point on said bus; said pump passing said liquid coolant directly through the hollow opening of said hollow conductive bus between said first and second axial points; said conduit means entering said housing at points adjacent said first and second axial points on said bus and being in electrically insulated relationship with respect to said bus; said pump means, conduit means and hollow bus forming a closed cooling system; said closed cooling system including heat exchange means positioned external of said housing; said hollow conductive bus including a first and second bus portion positioned end to end; said first axial point being in said first bus portion, said second axial point being in said second bus portion; a connecting means for said first and second bus portion; said connecting means including flexible electrical connecting means for establishing electrical continuity through said bus, and a hydraulic connecting means for establishing hydraulic continuity through the hollow center of said bus.

6. A forced cooling system for isolated phase bus; said isolated phase bus comprising an axially elongated hollow conductive bus and a hollow metal housing for said bus; said bus being carried centrally of said metal housing and being electrically insulated therefrom; said forced cooling system including liquid coolant means and a pump means therefor; said pump means being positioned externally of said metal housing; said forced cooling system further including conduit means for connecting an output end of said pump means to the hollow opening of said hollow conductive bus at a first axial point on said bus and an input end of said pump means to the hollow opening of said hollow conductive bus at a second axial point on said bus; said pump passing said liquid coolant directly through the hollow opening of said hollow conductive bus between said first and second axial points; said hollow conductive bus including a first and second bus portion positioned end to end; said first axial point being in said first bus portion, said second axial point being in said second bus portion; a connecting means for said first and second bus portion; said connecting means including flexible electrical connecting means for establishing electrical continuity through said bus, and a hydraulic connecting means for establishing hydraulic continuity through the hollow center of said bus; said flexible electrical connecting means being surrounded by a corona shield.

7. A forced liquid cooling system for a multiphase isolated phase bus system; said multiphase system including at least three phases; each of said phases comprising an elongated central bus conductor and a metal housing therefor; each of said metal housings having axially disposed insulator means positioned internally thereof for supporting its said respective bus conductor along the axis of said housing; each of said buses being hollow; said forced cooling system being adapted to force liquid coolant through the center of said hollow buses; said forced liquid cooling system including a common pump means having input conduit means connected to a first axial position on respective buses of said multiphase system and outlet conduit means connected to a second axial position on respective buses of said multiphase system; said pump means being external of said housings; said first and second conduit means passing through said housing means of said buses associated with said conduit means in insulated relationship; each of said hollow conductive buses including a first and second bus portion positioned end to end; said first axial position being in said first bus portions, said second axial positions being in said second bus portions; a connecting means for each of said first and second respective bus portions; each of said connecting means including flexible connecting means for establishing electrical continuity between respective first and second portions, and hydraulic connecting means for establishing hydraulic continuity through the hollow center of each of said buses.

8. A forced liquid cooling system for a multiphase isolated phase bus system; said multiphase system including at least three phases; each of said phases comprising an elongated central bus conductor and a metal housing therefor; each of said metal housings having axially disposed insulator means positioned internally thereof for supporting its said respective bus conductor along the axis of said housing; each of said buses being hollow; said forced cooling system being adapted to force liquid coolant through the center of said hollow buses; said forced liquid cooling system including a common pump means having input conduit means connected to a first axial position on respective buses of said multiphase system and outlet conduit means connected to a second axial position on respective buses of said multiphase system; said pump means being external of said housings; said first and second conduit means passing through said housing means of said buses associated with said conduit means in insulated relationship; whereby each of said housings remains insulated from its respective bus and from each of the other buses of said multiphase system; said pump means, first and second conduit means and said hollow buses forming a closed cooling system; said closed cooling system further including heat exchange means positioned external of said housings; each of said hollow conductive buses including a first and second bus portion positioned end to end; said first axial position being in said first bus portions, said second axial positions being in said second bus portions; a connecting means for each of said first and second respective bus portions; each of said connecting means including flexible connecting means for establishing electrical continuity between respective first and second portions, and hydraulic connecting means for establishing hydraulic continuity through the hollow center of each of said buses.

9. A forced liquid cooling system for a multiphase isolated phase bus system; said multiphase system including at least three phases; each of said phases comprising an elongated central bus conductor and a metal housing therefor; each of said metal housings having axially disposed insulator means positioned internally thereof for supporting its said respective bus conductor along the axis of said housing; each of said buses being hollow; said forced cooling system being adapted to force liquid coolant through the center of said hollow buses; said forced liquid cooling system including a common pump means having input conduit means connected to a first axial position on respective buses of said multiphase system and outlet conduit means connected to a second axial position on respective buses of said multiphase system; said pump means being external of said housings; said first and second conduit means passing through said housing means of said buses associated with said conduit means in insulated relationship; whereby each of said buses remains insulated from its respective bus and from each of the other housings of said multiphase system; said pump means, first and second conduit means and said hollow buses forming a closed cooling system; said closed cooling system further including heat exchange means positioned external of said housings; said closed cooling system carrying cooling fluid adjacent at least one end of said buses adapted to be connected to electrical equipment whereby said connected ends are subjected to the cooling of said liquid coolant.

10. A forced cooling system for isolated phase bus; said isolated phase bus comprising an axially elongated hollow conductive bus and a hollow metal housing for said bus; said bus being carried centrally of said metal housing and being electrically insulated therefrom; said forced cooling system including liquid coolant means and a pump means therefor; said pump means being positioned externally of said metal housing; said forced cooling system further including conduit means for connecting an output end of said pump means to the hollow opening of said hollow conductive bus at one end of said bus and an input end of said pump means to the hollow opening of said hollow conductive bus at the other end of said bus; said pump passing said liquid coolant directly through the hollow opening of said hollow conductive bus between the ends of said bus; said conduit means entering said housing at points adjacent the end of said bus and being in electrically insulated relationship with respect to said bus.

11. A forced liquid cooling system for a multiphase isolated phase bus system; said multiphase system including at least three phases; each of said phases comprising an elongated central bus conductor and a metal housing therefor; each of said metal housings having axially disposed insulator means positioned internally thereof for supporting its said respective bus conductor along the axis of said housing; each of said buses being hollow; said forced cooling system being adapted to force liquid coolant through the center of said hollow buses; said forced liquid cooling system including a common pump means having input conduit means connected to one end of said respective buses of said multiphase system and outlet conduit means connected to the other end of said respective buses of said multiphase system; said pump means being external of said housings; said first and second conduit means passing through said housing means of said buses associated with said conduit means in insulated relationship; whereby each of said housings remains insulated from its respective bus and from each of the other buses of said multiphase system.

References Cited in the file of this patent

UNITED STATES PATENTS

| | | |
|---|---|---|
| 2,229,006 | Rudd | Jan. 14, 1941 |
| 2,274,422 | Manoney | Feb. 24, 1942 |
| 2,306,850 | Usselman | Dec. 29, 1942 |
| 2,732,420 | Sillman | Jan. 24, 1956 |
| 2,861,119 | Collonge | Nov. 18, 1958 |
| 2,878,300 | Rugg | Mar. 17, 1959 |
| 2,878,302 | Perkins | Mar. 17, 1959 |